Aug. 15, 1933.        J. J. KROECKER        1,922,102
TOOL KIT HOLDER
Filed Sept. 10, 1931
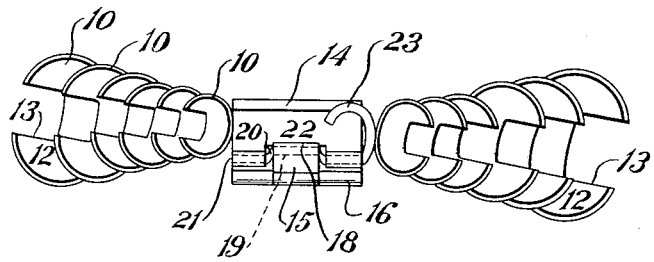
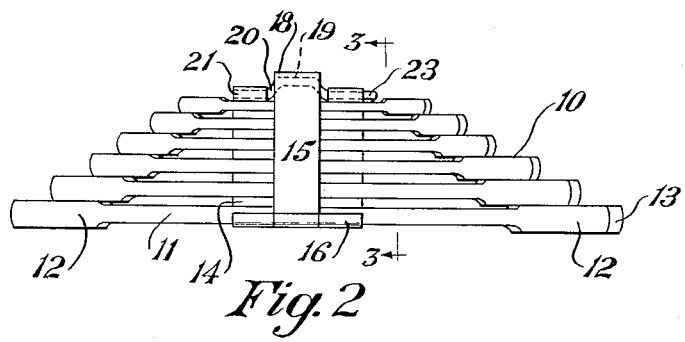
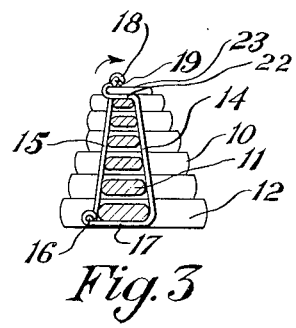
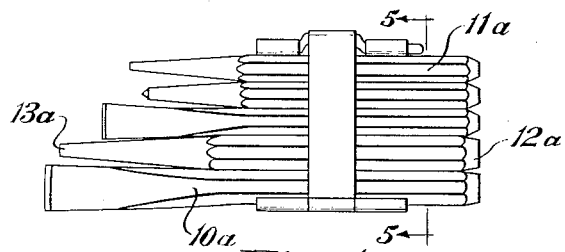
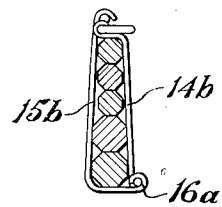
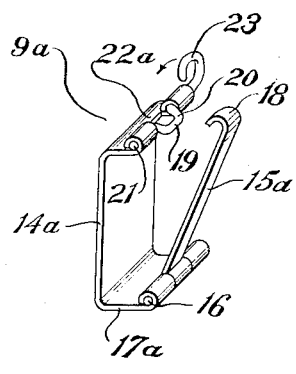
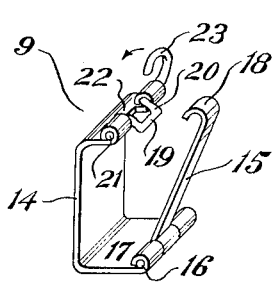
INVENTOR
BY *J.J.Kroecker*
*Frease and Bishop* ATTORNEYS Patented Aug. 15, 1933

1,922,102

UNITED STATES PATENT OFFICE 1,922,102

TOOL KIT HOLDER

Jacob J. Kroecker, Cleveland, Ohio, assignor to
The Fairmount Tool and Forging Company,
Cleveland, Ohio, a Corporation of Ohio Application September 10, 1931
Serial No. 562,091

5 Claims. (Cl. 206—16)

The invention relates to tools such as mechanic's tools, and more particularly to holders for conveniently assembling a plurality of tools, such as wrenches, punches, cold chisels, screw drivers, and the like, in a kit or package for shipping, merchandising, storing and use.

Holders of this general character have been designed and used, but all previous types of holders have either prevented the convenient extraction of one of the tools entirely from the kit; or have required the use of a separate wedge or spring member for holding the tools in assembled relation; or have utilized parts that are engaged together by nuts and bolts and the like; or have required the use of interabutting means for preventing any substantial relative longitudinal movement in either direction between the holder and tools, to maintain the same assembled; or have been adapted for use as a holder for only one particular type of tool such as for end wrenches.

As a result, these prior types of tool holders either prevent the convenient and ready use of the tools; or involve the use of parts which may become lost, or which require unnecessary time to be consumed in manufacturing, assembling or using the holders; or cost considerably more money to manufacture and assemble, because of design of and number of parts, than their use warrants.

It is therefore an object of the present invention to provide a tool holder whose design and operation enables the holder, merely by dimensional changes during manufacture, to be used as a kit holder for various types of tools, such as wrenches, punches, screw drivers, cold chisels, and the like.

A further object of the present invention is to provide a tool holder which does not require the use of interabutting means between the holder and tools for maintaining the same assembled in kit or package condition; and which may be used as a holder for tools that are not provided with enlargements engaged or required to be engaged by the holder.

It is a further object of the present invention to provide a holder which does not require the use of expensive screw threaded parts or separate wedge or spring parts for holding the tools in assembled relation.

It is a further object of the present invention to provide a tool holder, the parts of which are all permanently connected together, which may be instantly opened to enable one or all of the tools held thereby to be separately extracted or used, and which may just as quickly have tools reassembled therein and held thereby in kit or package form.

It is a further object of the present invention to provide a holder for tools which does not require an accurate selection of tools having variable individual thicknesses in originally assembling the tools and tool holder together at the place of manufacture thereof.

And finally, it is an object of the present invention to provide a tool holder which attains the combined beneficial results of all of the above objects and which has an extremely low cost of manufacture due to the simplicity of the design and assemblage of its parts, and which may be readily and easily operated and used in the proper manner by the most inexperienced person.

These and other objects may be obtained by the parts and combinations, preferred embodiments of which are shown in the drawing and hereinafter described in detail, which may be stated in general terms as including in a tool kit holder, binder means adapted to engirdle a plurality of tools including a plurality of preferably resilient members hinged together, hook means provided on one of the members, and crank means preferably rotatably carried by another member having a catch portion for detachable engagement with said hook means, whereby upon interengagement of said hook means and said crank means followed by movement of the crank means to assembled position, the tools are clamped together in assembled relation.

In the drawing,

Figure 1 is a top plan view of a wrench kit utilizing one type of improved holder;

Fig. 2 is a side elevation of the wrench kit shown in Fig. 1;

Fig. 3 is a cross section through the wrench kit shown in Figs. 1 and 2 taken on the line 3—3, Fig. 2;

Fig. 4 is a plan view of a punch and chisel kit utilizing a holder of the type shown in Figs. 1, 2 and 3;

Fig. 5 is a cross section through the wrench and chisel kit shown in Fig. 4 taken on the line 5—5 thereof;

Fig. 6 is a perspective view of the holder shown in Figs. 1, 2 and 3;

Fig. 7 is a perspective view of the holder shown in Figs. 4 and 5;

Fig. 8 is a view similar to Fig. 5 showing a slightly modified form of holder.

Similar numerals refer to similar parts throughout the drawing.

In Figs. 1, 2 and 3, the improved holder generally indicated at 9 in Fig. 6 is utilized as a kit holder for end wrenches 10 each comprising a shank 11 terminating at each end with an enlarged head 12 having a standard sized nut recess 13 formed therein in a usual manner.

The holder 9 preferably includes a channel-shaped strap member 14, and a strap member 15 having an integrally formed hinge portion provided with a hinge pin forming a hinge connection 16 at one end with an integrally formed hinge portion on one flange 17 of the channel-shaped member 14. The other end 18 of the strap member 15 is preferably provided with an integrally formed hook portion, which detachably engages the catch, eccentric, cam, or offset portion 19 of the crank member 20, rotatably mounted in integrally formed journals 21, on the other flange 22 of the channel-shaped member 14.

The holder 9, when opened as shown in Fig. 6, may be readily, quickly and easily filled with a plurality of wrenches 10, whereupon the hook portion 18 is cooperatively engaged over the catch member 19, and the crank 20 is rotated in the direction shown by the arrows in Figs. 3 and 6 until the member 19 swings past a top vertically extending position to a slightly lower position shown in Fig. 3.

The channel-shaped member 14, the strap member 15, and the crank member 20 are slightly resilient so that upon rotation of the crank member, all of the members spring to permit the catch member 19 to swing past top center to a slightly lower position to pressure clamp the wrenches against each other.

The crank 20 is preferably provided with an operating handle 23, which also acts as a stop by abutment against the flange 22 to limit rotation of the crank member past the postion shown in Fig. 3, so as to prevent further downward movement of the catch member 19 which would loosen the detachable hook and catch connection between the strap members which engirdle the shanks 11 of the wrenches 10 and serve as a binder for the same to form a wrench kit.

In Figs. 4 and 5, the improved holder generally indicated at 9a in Fig. 7 is utilized as a kit holder for punches and chisels 10a, each having shanks 11a, and heads 12a and 13a.

The holder 9a preferably includes a channel-shaped strap member 14a, and a strap member 15a having an integrally formed hinge portion provided with a hinge pin forming a hinge connection 16 at one end with an integrally formed hinge portion on one flange 17a of the channel-shaped member 14a. The other end 18 of the strap member is preferably provided with an integrally formed hook portion, which detachably engages the catch, eccentric, cam or offset portion 19 of the crank member 20, rotatably mounted in integrally formed journals 21, on the other flange 22a of the channel-shaped member 14a.

The holder 9a, when opened as shown in Fig. 7, may be readily, quickly and easily filled with a plurality of chisels or punches 10a, whereupon the hook portion 18 is cooperatively engaged over the catch member 19, and the crank 20 is rotated in the direction shown by the arrow in Figs. 5 and 7 until the member 19 swings past a top vertically extending position to a slightly lower position shown in Fig. 5.

The channel-shaped member 14a, the strap member 15a, and the crank member 20 are slightly resilient so that upon rotation of the crank member, all of the members spring to permit the catch member 19 to swing past top center to a slightly lower position to pressure clamp the shanks of the punches and chisels against each other.

The crank 20 is preferably provided with an operating handle 23 which also acts as a stop by abutment against the flange 22a to limit rotation of the crank member past the position shown in Fig. 5, so as to prevent further downward movement of the catch member 10 which would loosen the detachable hook and catch connection between the strap members which engirdle the shanks 11a of the punches and chisels 10a and serve as a binder for the same to form a tool kit.

The improved holder shown in Fig. 8 as a kit holder for chisels and punches, is the same in design, construction and operation as the holders shown in the remaining figures of the drawing excepting only that the integrally formed hinge portions forming the hinge connection 16a between the straps 14b and 15b is located at a corner diagonally opposite the hook and catch connection between the strap members.

Accordingly, a tool holder is provided for conveniently assembling tools in a kit or package for shipping, merchandising, storing or use, which is adapted for use with a variety of types of tools, which is self-contained, which can be instantly opened or closed, which has an extremely low cost of manufacture, and which pressure clamps the tools engirdled thereby against each other.

I claim:—

1. In a tool kit holder, binder means adapted to engirdle and clamp a plurality of tools together including a plurality of members hinged together, hook means provided on one of the members, and crank means movably mounted on another member detachably engaging said hook means, whereby cooperative engagement of said hook and crank means pressure clamps tools engirdled by the members against each other.

2. In a tool kit holder, binder means adapted to engirdle and clamp a plurality of tools together including a plurality of resilient members hinged together, hook means provided on one of the resilient members, and a crank rotatably mounted on another member having a catch portion detachably engaging said hook means, whereby cooperative engagement of said hook means and said catch by rotation of said crank springs the resilient members to pressure clamp tools engirdled thereby against each other.

3. In a tool kit holder, binder means adapted to engirdle and clamp a plurality of tools together including a plurality of strap members, a hinge connection between said strap members, a hook and catch connection between said strap members, one of said connections being detachable, and one of said connections including a crank member rotatably mounted on one of the members, and a stop for limiting rotation of said crank member.

4. In a tool kit holder, binder means adapted to engirdle and clamp a plurality of tools together including a channel-shaped member, a strap member having a hinge connection at one end with one flange of the channel-shaped member and provided with a hook portion at its other end, a catch member mounted on the other flange of the channel-shaped member for detachable connection with said hook portion, one of said connections between said strap member and said channel-shaped member including a rotatably mounted crank member, and a stop for limiting rotation of said crank member.

5. In a tool kit holder, binder means adapted to engirdle and clamp a plurality of tools together, including a plurality of strap members, one end of each of the strap members having an integrally formed hinge portion, a hinge pin in the hinge portions forming a hinge connection between said strap members, the other end of one of the strap members having integrally formed journals, a crank member rotatably mounted in the journals, and the other end of the other strap member having an integrally formed hook portion adapted for detachable connection with the crank member, whereby cooperative engagement of said hook and crank members pressure clamps tools engirdled by the strap members against each other.

JACOB J. KROECKER.